United States Patent
Chinen et al.

(10) Patent No.: US 12,094,332 B2
(45) Date of Patent: Sep. 17, 2024

(54) REDUCING ECONOMIC LOSS DUE TO TRAFFIC INCIDENTS BY PROPOSING ACTIONS

(71) Applicant: International Business Machines Corporation, Armonk, NY (US)

(72) Inventors: Mitsuru Chinen, Yokohama (JP); Akira Saito, Ichikawa (JP); Sanehiro Furuichi, Setagaya-ku (JP); Takeshi Watanabe, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 17/657,394

(22) Filed: Mar. 31, 2022

(65) Prior Publication Data

US 2023/0316901 A1    Oct. 5, 2023

(51) Int. Cl.
*G08G 1/01*      (2006.01)
*G06N 20/00*    (2019.01)
*G08G 1/09*      (2006.01)

(52) U.S. Cl.
CPC .......... *G08G 1/0145* (2013.01); *G06N 20/00* (2019.01); *G08G 1/0133* (2013.01); *G08G 1/0141* (2013.01); *G08G 1/091* (2013.01)

(58) Field of Classification Search
CPC .. G08G 1/0145; G08G 1/0133; G08G 1/0141; G08G 1/091; G60N 20/00
See application file for complete search history.

(56) References Cited

U.S. PATENT DOCUMENTS

| 2003/0225600 A1 | 12/2003 | Slivka |
| 2004/0039614 A1 | 2/2004 | Maycotte |
| 2013/0117057 A1 | 5/2013 | Van Moltke |

(Continued)

FOREIGN PATENT DOCUMENTS

| JP | 2013003991 A | 1/2013 |
| JP | 2015084220 A | 4/2015 |

(Continued)

OTHER PUBLICATIONS

Ma et al.; User-Driven Cloud Transportation System for Smart Driving; 2012 IEEE 4th International Conference on Cloud Computing Technology and Science; pp. 658-665 (Year: 2012).*

(Continued)

*Primary Examiner* — Michael J Zanelli
(74) *Attorney, Agent, or Firm* — Aaron Pontikos

(57) ABSTRACT

In an approach for reducing economic loss due to traffic events, a processor receives a set of transportation operation information from one or more transportation service providers about a traffic event. A processor analyzes the set of transportation operation information to identify an area affected by the traffic event and one or more users affected by the traffic event. A processor gathers a set of information about each user of the one or more users affected by the traffic event. A processor prioritizes the one or more users affected by the traffic event. A processor determines an alternative plan for each user of the one or more users affected by the traffic event based on the set of information and a priority number given to each user. A processor proposes the alternative plan to each user of the one or more users affected by the traffic event.

20 Claims, 10 Drawing Sheets

(56) References Cited

U.S. PATENT DOCUMENTS

| | | | |
|---|---|---|---|
| 2018/0032926 A1* | 2/2018 | DeLuca | G06Q 10/025 |
| 2018/0101878 A1* | 4/2018 | Marueli | G06Q 30/0284 |
| 2018/0122228 A1* | 5/2018 | Holleczek | H04W 4/029 |
| 2018/0321049 A1* | 11/2018 | Lim | G08G 1/144 |
| 2019/0171988 A1* | 6/2019 | Kwatra | G06Q 50/40 |
| 2019/0279124 A1 | 9/2019 | Beynel | |

FOREIGN PATENT DOCUMENTS

| | | |
|---|---|---|
| JP | 2017059099 A | 3/2017 |
| TW | I720956 B * | 3/2021 |

OTHER PUBLICATIONS

Maas Alliance, "Data makes MaaS happen", MaaS Alliance, Nov. 2018, 9 Pages.

Muto et al., "A Method to Evaluate the Economic Burden on Passengers Affected by Rail Transport Disorder", Quarterly Report of RTRI, vol. 51, No. 2, May 2010, 5 Pages.

Steenbruggen et al., "Mobile phone data from GSM networks for traffic parameter and urban spatial pattern assessment: a review of applications and opportunities", GeoJournal, vol. 78, No. 2, Apr. 2011, 21 Pages.

Usuda, Tsutoya, "Coupons will be distributed immediately due to train delays. MaaS demonstration experiment using blockchain", Impress Watch, Aug. 17, 2020, 4 Pages.

Wang et al., "Optimization of Bus Bridging Service under Unexpected Metro Disruptions with Dynamic Passenger Flows", Hindawi, Journal of Advanced Transportation, vol. 2019, Article ID: 6965728, Jul. 24, 2019, 14 Pages.

Mell et al., "The NIST Definition of Cloud Computing", Recommendations of the National Institute of Standards and Technology, NIST Special Publication 800-145, Sep. 2011, 7 pages.

* cited by examiner

REDUCING ECONOMIC LOSS DUE TO TRAFFIC INCIDENTS BY PROPOSING ACTIONS

BACKGROUND OF THE INVENTION

The present invention relates generally to the field of data processing, and more particularly to reducing economic loss due to traffic incidents by proposing actions.

In today's interconnected and complex society, the use of computers, network appliances, and similar data processing devices are more commonplace. Processing devices, with the advent and further miniaturization of integrated circuits, have made it possible to be integrated into a wide variety of personal, business, health, home, education, entertainment, travel, and other devices.

Mobility-as-a-Service (MaaS) is a cloud computing delivery model under Anything-as-a-Service (XaaS). MaaS is a framework that facilitates the deployment of mobility functionalities for various other services and applications within the cloud. MaaS describes a shift away from personally owned modes of transportation and towards mobility solutions that are consumed as a service. MaaS may be enabled by combining transportation services from public and private transportation providers through a unified gateway that creates and manages travel from an origin to a destination. In one aspect, MaaS may offer both travelers and goods mobility solutions based on travel needs. MaaS is not limited to individual mobility; the approach can be applied to the movement of goods, particularly in urban areas.

SUMMARY

Aspects of an embodiment of the present invention disclose a method, computer program product, and computer system for reducing economic loss due to traffic events, a processor receives a set of transportation operation information from one or more transportation service providers about a traffic event. A processor analyzes the set of transportation operation information to identify an area affected by the traffic event and one or more users affected by the traffic event. A processor gathers a set of information about each user of the one or more users affected by the traffic event from respective applications on respective user computing devices of the one or more users. A processor prioritizes the one or more users affected by the traffic event based on the set of information. A processor determines an alternative plan for each user of the one or more users affected by the traffic event based on the set of information and a priority number given to each user. A processor proposes the alternative plan to each user of the one or more users affected by the traffic event.

In some aspects of an embodiment of the present invention, the set of information about each user of the one or more users affected by the traffic event includes a current location of a respective user, a destination location of the respective user, and a schedule of the respective user.

In some aspects of an embodiment of the present invention, subsequent to gathering the set of information about each user of the one or more users affected by the traffic event from the respective applications on the respective user computing devices of the one or more users affected by the traffic event, a processor anonymizes each user by mapping a name of each user to a temporary identification number.

In some aspects of an embodiment of the present invention, a processor identifies a source of transportation of each user of the one or more users affected by the traffic event. A processor identifies one or more alternative sources of transportation accessible to each user of the one or more users affected by the traffic event.

In some aspects of an embodiment of the present invention, a highest priority number is given to a user who requires special care and attention due to a medical condition.

In some aspects of an embodiment of the present invention, a processor selects a logic determined to be effective based on a set of machine learned results for the area affected by the traffic event and an expected amount of time until the traffic event has concluded. A processor selects two or more logics determined to be effective based on a set of machine learned results for the area affected by the traffic event and an expected amount of time until the traffic event has concluded.

In some aspects of an embodiment of the present invention, the logic is an alternative means to complete an original plan of the user or an alternative way to use a spare time the user has until the traffic event has concluded.

In some aspects of an embodiment of the present invention, a processor determines whether the traffic event has concluded. Responsive to determining the traffic event has not concluded, a processor determines whether the expected amount of time until the traffic event has concluded has been reduced. Responsive to determining the expected amount of time of the traffic event has not been reduced, a processor switches to an alternative logic determined to be effective based on a set of machine learned results for the affected area and the expected amount of time until the traffic event has concluded.

These and other features and advantages of the present invention will be described in, or will become apparent to those of ordinary skill in the art in view of, the following detailed description of the example embodiments of the present invention.

DETAILED DESCRIPTION

Figure 1:
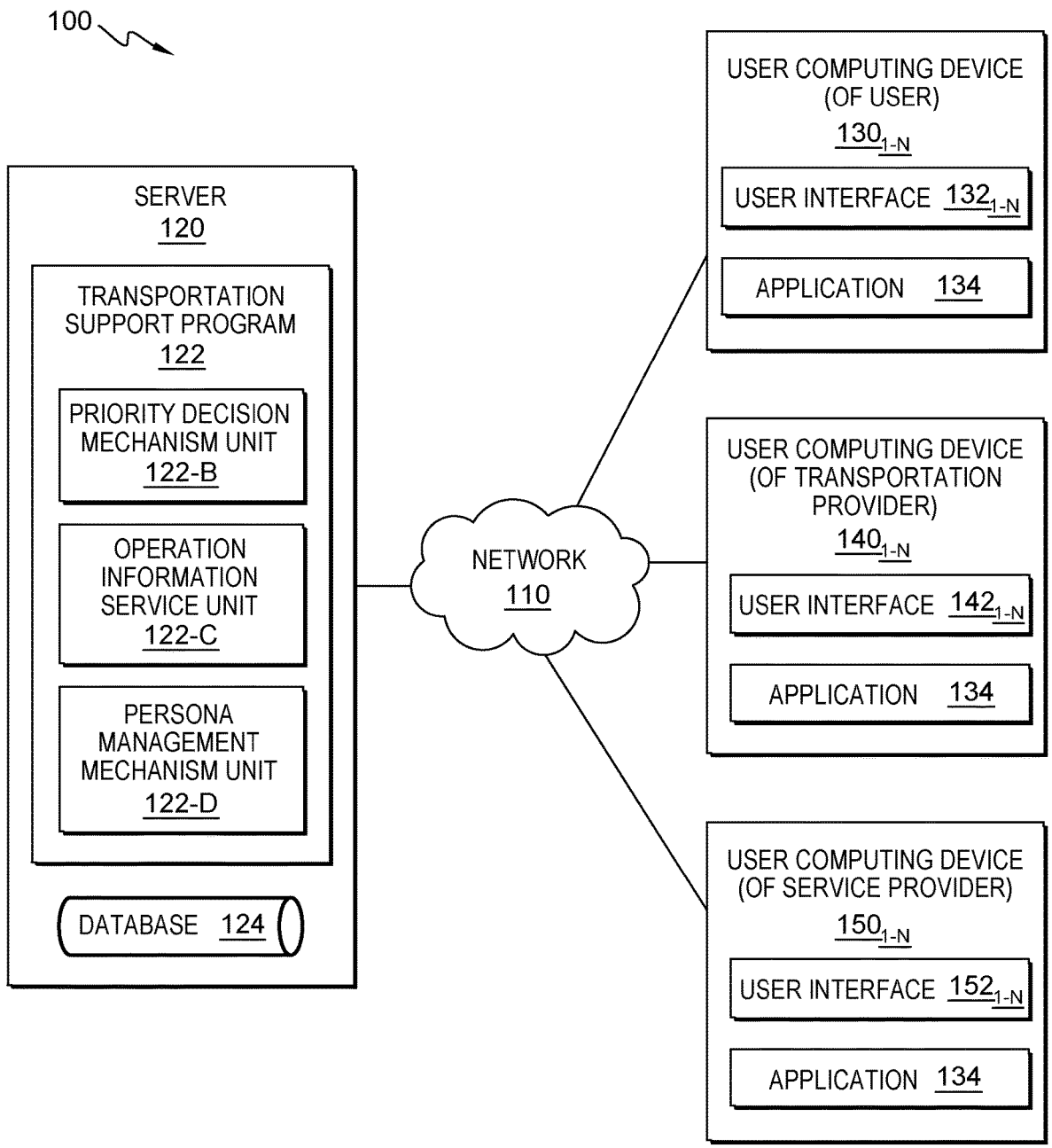
FIG. 1 is a functional block diagram illustrating a MaaS transportation support environment, in accordance with an embodiment of the present invention.

Embodiments of the present invention recognize that disruptions in public transportation may have major implications on passengers and on service providers. For example, disruptions may increase a passenger's nominal travel time, due to additional waiting time, in-vehicle time, and/or transfers. Disruptions may increase higher crowding levels on alternative public transportation options, resulting in a more negatively perceived in-vehicle time. Disruptions may also imply additional costs for the service provider, due to overtime payments to personnel, possible fare reimbursements for delayed passengers, and in the case of contractual agreements between the service provider and the authority resulting in fines. In the long term, disruptions may result in a loss of revenue if ridership levels decrease because of a perceived unreliability of public transportation.

Embodiments of the present invention recognize that leaving, to individual judgment, how to detour around a source of disruption in public transportation or how to utilize spare time until the disruption is resolved can be problematic. Therefore, embodiments of the present invention recognize the need for a system and method to examine and assess the source of disruption as well as the passengers who are affected by the disruption and the impact the disruption will have on the passengers. Further, embodiments of the present invention recognize the need for a system and method to control a flow of passengers who are affected by the disruption by assisting each passenger with taking a detour or utilizing the spare time the passenger has until the disruption is resolved.

Embodiments of the present invention provide a system and method to control a flow of passengers who are affected by a disruption in public transportation in order to suppress any economic and/or noneconomic loss that the passengers and the service providers may experience. The flow of passengers who are affected by the disruption is controlled by prioritizing a route (including an alternative route) and a source of transportation based on each passenger's characteristics. The flow of passengers who are affected by the disruption is also controlled by acting promptly to secure each passenger an alternative source of transportation that will reduce the economic loss the passenger may experience. Lastly, the flow of passengers who are affected by the disruption is controlled by presenting each passenger with an alternative plan to take a detour to the passenger's destination location (i.e., with the alternative source of transportation and the alternative set of directions) or, when a detour is not available or not favorable, by presenting each passenger with an alternative plan to utilize the spare time the passenger has until the disruption is resolved (e.g., providing coupons to be redeemed for a discount on the purchase of an item or an experience). An economic loss is a measurable, objectively verifiable, and real loss, while a noneconomic loss is a subjective, unquantifiable, non-monetary loss. An economic loss may include, but is not limited to, compensation for alternative transportation options, lost earnings, lost opportunities as a result of missing scheduled activities, and costs associated with utilizing spare time (e.g., costs associated with the issuance of a coupon). A noneconomic loss may include, but is not limited to, pain, suffering, emotional distress, and loss related to reputation.

Implementation of embodiments of the present invention may take a variety of forms, and exemplary implementation details are discussed subsequently with reference to the Figures.

FIG. 1 is a functional block diagram illustrating a MaaS transportation support environment, generally designated 100, in accordance with an embodiment of the present invention. In the depicted embodiment, MaaS transportation support environment 100 includes server 120, user computing device $130_{1-N}$, user computing device $140_{1-N}$, and user computing device $150_{1-N}$, interconnected over network 110. MaaS transportation support environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device $130_{1-N}$, user computing device $140_{1-N}$, user computing device $150_{1-N}$, and other computing devices (not shown) within MaaS transportation support environment 100.

Server 120 operates to run transportation support program 122 and to send and/or store data in database 124. In an embodiment, server 120 can send data from database 124 to user computing device $130_{1-N}$, user computing device $140_{1-N}$, and/or user computing device $150_{1-N}$. In an embodiment, server 120 can receive data in database 124 from user computing device $130_{1-N}$, user computing device $140_{1-N}$, and/or user computing device $150_{1-N}$. In one or more embodiments, server 120 can be a standalone computing device, a management server, a web server, a mobile computing device, or any other electronic device or computing system capable of receiving, sending, and processing data and capable of communicating with user computing device $130_{1-N}$, user computing device $140_{1-N}$, and/or user computing device $150_{1-N}$ via network 110. In one or more embodiments, server 120 can be a computing system utilizing clustered computers and components (e.g., database server computers, application server computers, etc.) that act as a single pool of seamless resources when accessed within MaaS transportation support environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device $130_{1-N}$, user computing device $140_{1-N}$, user computing device $150_{1-N}$, and other computing devices (not shown) within MaaS transportation support environment 100 via network 110. Server 120 may include internal and external hardware components, as depicted and described in further detail in FIG. 2.

Transportation support program 122 operates to control a flow of passengers at a source of a disruption in public transportation in order to suppress any economic and/or noneconomic loss that the passengers and the service providers may experience. In the depicted embodiment, transportation support program 122 is a standalone program. In another embodiment, transportation support program 122 may be integrated into another software product, such as a transportation support software (e.g., a transfer navigation software used in present time). In the depicted embodiment, transportation support program 122 resides on server 120. In another embodiment, transportation support program 122 may reside on user computing device $130_{1-N}$ or on another computing device (not shown), provided that transportation support program 122 has access to network 110. In the depicted embodiment, transportation support program 122 contains priority decision mechanism unit 122-B, operation information service unit 122-C, and persona management mechanism unit 122-D. The operational steps of transportation support program 122 are depicted and described in further detail with respect to FIG. 6. The operational steps of a first component of transportation support program 122 are depicted and described in further detail with respect to FIG. 7. The operational steps of a second component of transportation support program 122 are depicted and described in further detail with respect to FIG. 8. A diagram illustrating an exemplary application of transportation support program 122 is depicted and described in further detail with respect to FIG. 9. A diagram illustrating exemplary alert notifications sent during an application of transportation support program 122 is depicted and described in further detail with respect to FIG. 10.

In an embodiment, the user of user computing device $130_{1-N}$ registers with server 120. For example, the user completes a registration process (e.g., user validation), provides information to create a user profile, and authorizes the collection, analysis, and distribution (i.e., opts-in) of relevant data on identified computing devices (e.g., on user computing device $130_{1-N}$) by server 120 (e.g., via transportation support program 122). Information to create a user profile includes, but is not limited to, user specific data. In an embodiment, transportation support program 122 collects user specific data from the user through user interface $132_{1-N}$ of user computing device $130_{1-N}$. Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

In an embodiment, transportation support program 122 creates a user profile. In an embodiment, transportation support program 122 creates a user profile with user-specific data collected. In an embodiment, transportation support program 122 stores the user profile in a database, e.g., database 124. In an embodiment, transportation support program 122 stores the user profile in a database for future iterations of transportation support program 122.

Database 124 operates as a repository for data received, used, and/or generated by transportation support program 122. A database is an organized collection of data. Data includes, but is not limited to, information about user profiles, user preferences (e.g., general user system settings such as alert notifications for user computing device $130_{1-N}$); information about alert notification preferences; user specific data; feedback received from the user; and any other data received, used, and/or generated by transportation support program 122.

Database 124 can be implemented with any type of device capable of storing data and configuration files that can be accessed and utilized by server 120, such as a hard disk drive, a database server, or a flash memory. In an embodiment, database 124 is accessed by transportation support program 122 to store and/or to access the data. In the depicted embodiment, database 124 resides on server 120. In another embodiment, database 124 may reside on another computing device, server, cloud server, or spread across multiple devices elsewhere (not shown) within MaaS transportation support environment 100, provided that transportation support program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Transportation support program 122 enables the authorized and secure processing of personal data.

Transportation support program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Transportation support program 122 provides information regarding personal and/or confidential data and the nature (e.g., type, scope, purpose, duration, etc.) of the processing. Transportation support program 122 provides the user with copies of stored personal and/or confidential company data. Transportation support program 122 allows the correction or completion of incorrect or incomplete personal and/or confidential data. Transportation support program 122 allows for the immediate deletion of personal and/or confidential data.

User computing device $130_{1-N}$ operates to run user interface $132_{1-N}$ through which a user can interact with transportation support program 122 on server 120. In an embodiment, a user associated with user computing device $130_{1-N}$ is an operator of a motor vehicle. In another embodiment, a user associated with user computing device $130_{1-N}$ is a person who travels on a source of public transportation (i.e., a system of buses, trains, airplanes, etc. running on fixed routes, on which the public may travel). In some embodiments, there may be more than one user computing device $130_{1-N}$, i.e., more than one user, e.g., more than one operator of a motor vehicle or more than one commuter.

In an embodiment, user computing device $130_{1-N}$ represents a plurality of user computing devices that perform programmable instructions. As used herein, N represents a positive integer, and accordingly the number of scenarios implemented in a given embodiment of the present invention is not limited to those depicted in FIG. 1. For example, user computing device $130_{1-N}$ may be an electronic device, such as a laptop computer, a tablet computer, a netbook computer, a personal computer, a desktop computer, a smart phone, or any programmable electronic device capable of running user interface $132_{1-N}$ and of communicating (i.e., sending and receiving data) with transportation support program 122 via network 110. In general, user computing device $130_{1-N}$ represents any programmable electronic device or a combination of programmable electronic devices capable of executing machine readable program instructions and communicating with other computing devices (not shown) within MaaS transportation support environment 100 via network 110. In the depicted embodiment, user computing device $130_{1-N}$ includes an instance of user interface $132_{1-N}$.

User interface $132_{1-N}$ operates as a local user interface between transportation support program 122 on server 120 and a user of user computing device $130_{1-N}$. In some embodiments, user interface $132_{1-N}$ is a graphical user interface (GUI), a web user interface (WUI), and/or a voice user interface (VUI) that can display (i.e., visually) or present (i.e., audibly) text, documents, web browser windows, user options, application interfaces, and instructions for operations sent from transportation support program 122 to a user via network 110. User interface $132_{1-N}$ can also display or present alerts including information (such as graphics, text, and/or sound) sent from transportation support program 122 to a user via network 110. In an embodiment, user interface $132_{1-N}$ is capable of sending and receiving data (i.e., to and from transportation support program 122 via network 110, respectively). Through user interface $132_{1-N}$, a user can opt-in to transportation support program 122; create a user profile; set user preferences and alert notification preferences; receive an alert notification; request an alternative means to complete the original plan of each user; request an alternative way to utilize the spare time each user has until the traffic event is complete; select an external service from the list of external services; receive a request for feedback; and input feedback.

A user preference is a setting that can be customized for a particular user. A set of default user preferences are assigned to each user of transportation support program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of transportation support program 122.

User computing device $140_{1-N}$ operates to run user interface $142_{1-N}$ through which a user can interact with transportation support program 122 on server 120. In an embodiment, a user associated with user computing device $140_{1-N}$ is a transportation provider. A transportation provider is a provider of commuter transportation (i.e., a system of buses, trains, airplanes, etc. running on fixed routes, on which the public may travel). For example, user computing device $140_{1-N}$ may be an electronic device, such as a laptop computer, a tablet computer, a netbook computer, a personal computer, a desktop computer, a smart phone, or any programmable electronic device capable of running user interface $142_{1-N}$ and of communicating (i.e., sending and receiving data) with transportation support program 122 via network 110. In general, user computing device $140_{1-N}$ represents any programmable electronic device or a combination of programmable electronic devices capable of executing machine readable program instructions and communicating with other computing devices (not shown) within MaaS transportation support environment 100 via network 110. In the depicted embodiment, user computing device $140_{1-N}$ includes an instance of user interface $142_{1-N}$.

User interface $142_{1-N}$ operates as a local user interface between transportation support program 122 on server 120 and a user of user computing device $140_{1-N}$. In some embodiments, user interface $142_{1-N}$ is a graphical user interface (GUI), a web user interface (WUI), and/or a voice user interface (VUI) that can display (i.e., visually) or present (i.e., audibly) text, documents, web browser windows, user options, application interfaces, and instructions for operations sent from transportation support program 122 to a user via network 110. User interface $142_{1-N}$ can also display or present alerts including information (such as graphics, text, and/or sound) sent from transportation support program 122 to a user via network 110. In an embodiment, user interface $142_{1-N}$ is capable of sending and receiving data (i.e., to and from transportation support program 122 via network 110, respectively). Through user interface $142_{1-N}$, the transportation provider may opt-in to transportation support program 122; create a user profile; set user preferences and alert notification preferences; receive an alert notification; input a set of transportation operation information about a traffic event; receive a request for feedback; and input feedback.

User computing device $150_{1-N}$ operates to run user interface $152_{1-N}$ through which a user can interact with transportation support program 122 on server 120. In an embodiment, a user associated with user computing device $140_{1-N}$ is a service provider. A service provider is a provider of any applicable good or service to the user (e.g., a business engaged in commercial, industrial, or professional activities). For example, user computing device $150_{1-N}$ may be an electronic device, such as a laptop computer, a tablet computer, a netbook computer, a personal computer, a desktop computer, a smart phone, or any programmable electronic device capable of running user interface $152_{1-N}$ and of communicating (i.e., sending and receiving data) with transportation support program 122 via network 110. In general, user computing device $150_{1-N}$ represents any programmable electronic device or a combination of programmable electronic devices capable of executing machine readable program instructions and communicating with other computing devices (not shown) within MaaS transportation support environment 100 via network 110. In the depicted embodiment, user computing device $150_{1-N}$ includes an instance of user interface $152_{1-N}$.

User interface $152_{1-N}$ operates as a local user interface between transportation support program 122 on server 120 and a user of user computing device $150_{1-N}$. In some embodiments, user interface $152_{1-N}$ is a graphical user interface (GUI), a web user interface (WUI), and/or a voice user interface (VUI) that can display (i.e., visually) or present (i.e., audibly) text, documents, web browser windows, user options, application interfaces, and instructions for operations sent from transportation support program 122 to a user via network 110. User interface $152_{1-N}$ can also display or present alerts including information (such as graphics, text, and/or sound) sent from transportation support program 122 to a user via network 110. In an embodiment, user interface $152_{1-N}$ is capable of sending and receiving data (i.e., to and from transportation support program 122 via network 110, respectively). Through user interface $152_{1-N}$, the service provider may opt-in to transportation support program 122; create a user profile; set user preferences and alert notification preferences; receive an alert notification; receive a request for feedback; and input feedback.

Figure 2:
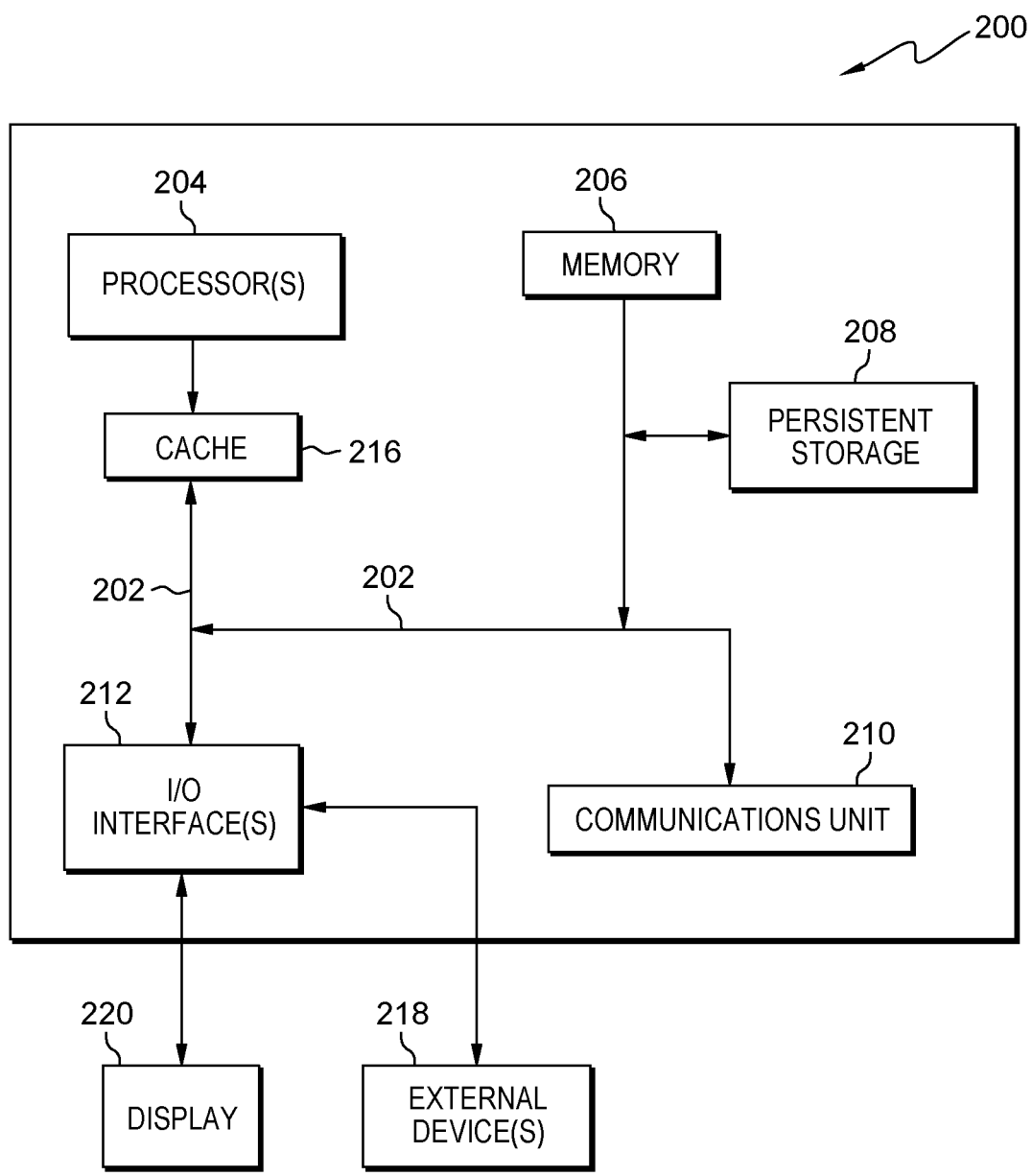
FIG. 2 is a block diagram illustrating the components of a server within the MaaS transportation support environment of FIG. 1, in accordance with an embodiment of the present invention.

FIG. 2 is a block diagram illustrating the components of server computer 120 within MaaS transportation support environment 100 of FIG. 1, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Computing device 200 includes processor(s) 204, memory 206, cache 216, communications fabric 202, persistent storage 208, input/output (I/O) interface(s) 212, and communications unit 210.

Communications fabric 202 provides communications between memory 206, cache 216, persistent storage 208, input/output (I/O) interface(s) 212, and communications unit 210. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses or a cross switch.

Memory 206 and persistent storage 208 are computer readable storage media. In this embodiment, memory 206 includes random access memory (RAM). In general, memory 206 can include any suitable volatile or non-volatile computer readable storage media. Cache 216 is a fast memory that enhances the performance of computer processor(s) 204 by holding recently accessed data, and data near accessed data, from memory 206.

Program instructions and data (e.g., software and data) used to practice embodiments of the present invention, e.g., transportation support program 122, may be stored in persistent storage 208 and in memory 206 for execution by one or more of the respective processor(s) 204 via cache 216. In an embodiment, persistent storage 208 includes a magnetic hard disk drive. Alternatively, or in addition to a magnetic hard disk drive, persistent storage 208 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 208 may also be removable. For example, a removable hard drive may be used for persistent storage 208. Other examples include optical and magnetic disks, thumb drives, and smart cards that are inserted into a drive for transfer onto another computer readable storage medium that is also part of persistent storage 208. Software and data can be stored in persistent storage 208 for access and/or execution by one or more of the respective processor(s) 204 via cache 216. With respect to user computing device $130_{1-N}$, software and data includes user interface $132_{1-N}$. With respect to server 120, software and data includes transportation support program 122.

Communications unit 210, in these examples, provides for communications with other data processing systems or devices. In these examples, communications unit 210 includes one or more network interface cards. Communications unit 210 may provide communications through the use of either or both physical and wireless communications links. Program instructions and data (e.g., software and data) used to practice embodiments of the present invention may be downloaded to persistent storage 208 through communications unit 210.

I/O interface(s) 212 allows for input and output of data with other devices that may be connected to each computer system. For example, I/O interface(s) 212 may provide a connection to external device(s) 218, such as a keyboard, a keypad, a touch screen, and/or some other suitable input device. External device(s) 218 can also include portable computer readable storage media, such as, for example, thumb drives, portable optical or magnetic disks, and memory cards. Program instructions and data (e.g., software and data) used to practice embodiments of the present invention, e.g., transportation support program 122 on server computer 120, can be stored on such portable computer readable storage media and can be loaded onto persistent storage 208 via I/O interface(s) 212. I/O interface(s) 212 also connect to display 220.

Display 220 provides a mechanism to display data to a user and may be, for example, a computer monitor. Display 220 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
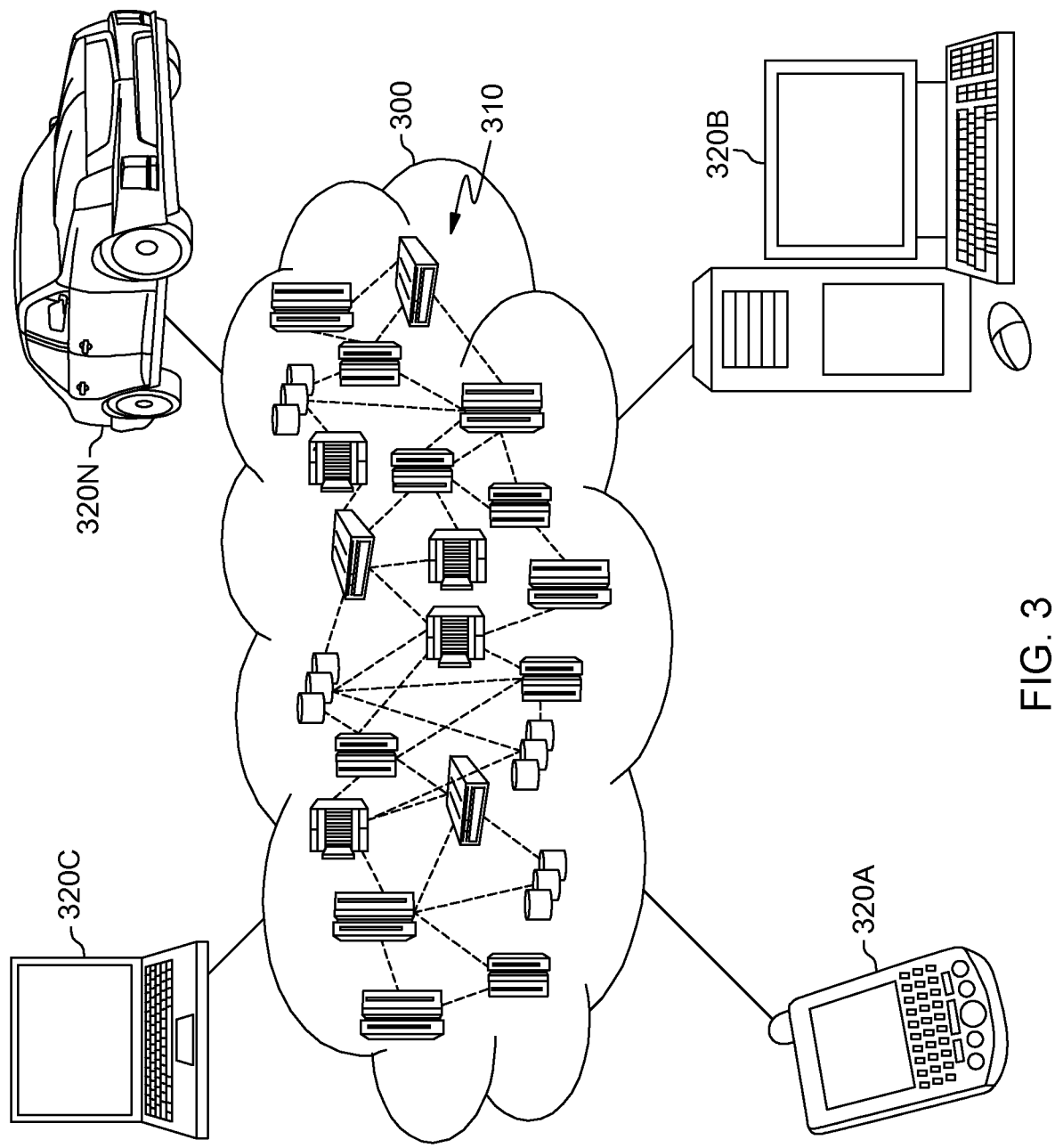
FIG. 3 is a block diagram illustrating an exemplary cloud computing environment, in accordance with an embodiment of the present invention.

FIG. 3 is a block diagram illustrating an exemplary cloud computing environment, generally designated cloud computing environment 300, in accordance with an embodiment of the present invention. As shown, cloud computing environment 300 includes one or more cloud computing nodes 310 with which local computing devices used by cloud consumers, such as, for example, personal digital assistant (PDA) or cellular telephone 320A, desktop computer 320B, laptop computer 320C, and/or automobile computer system 320N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms, and/or software as services for which a cloud consumer does not need to maintain resources on a local computing device. It is understood that the types of computing devices 320A-N shown in FIG. 3 are intended to be illustrative only and that computing nodes 310 and cloud computing environment 300 can communicate with any type of computerized device over any type of network and/or network addressable connection (e.g., using a web browser).

Figure 4:
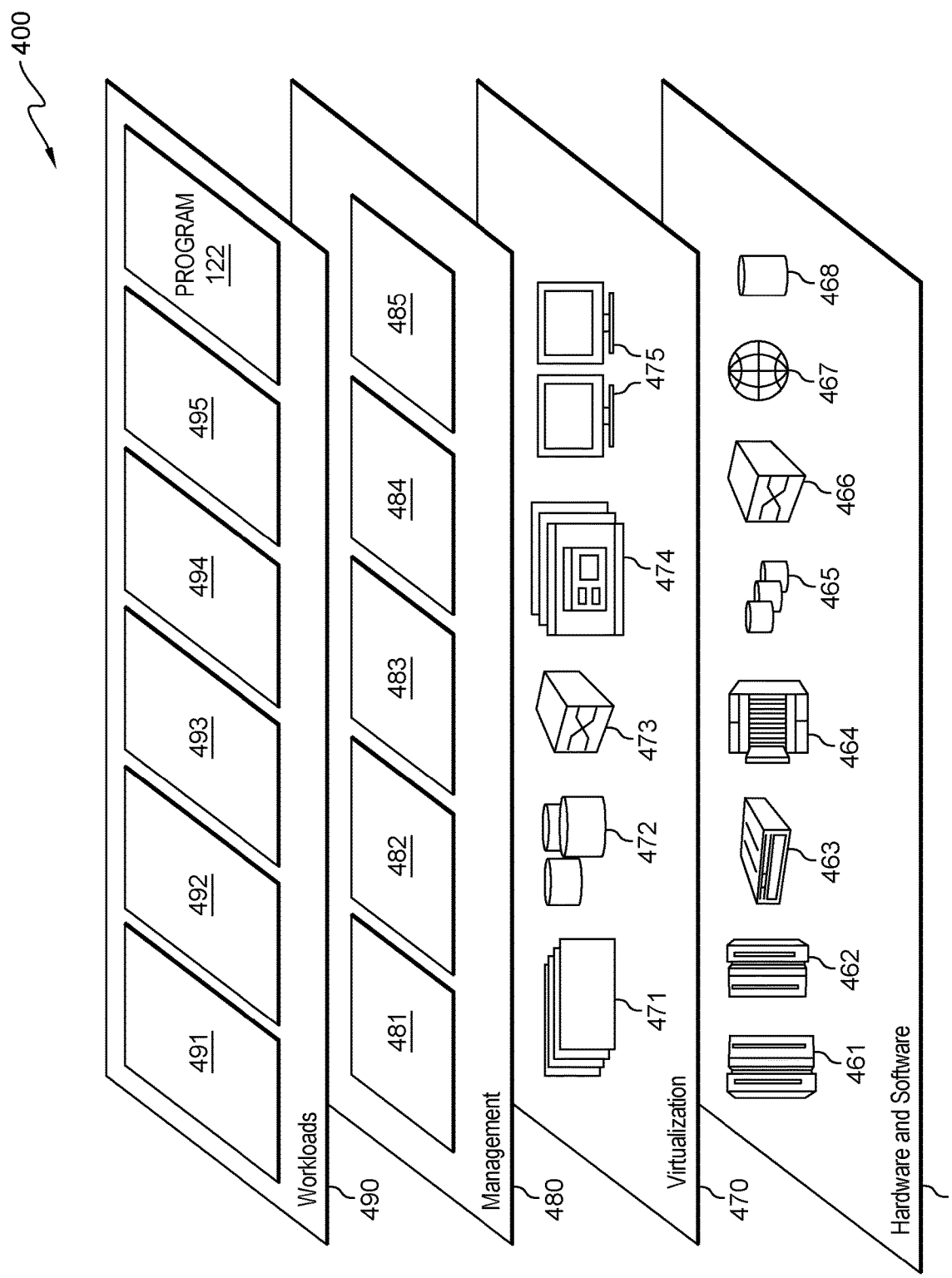
FIG. 4 is a block diagram illustrating a set of functional abstraction model layers of the exemplary cloud computing environment, in accordance with an embodiment of the present invention.

FIG. 4 is a block diagram illustrating a set of functional abstraction model layers, generally designated 400, of the exemplary cloud computing environment (e.g., cloud computing environment 300), in accordance with an embodiment of the present invention. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provides pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; data analytics processing 493; transaction processing 494; and, in the context of the illustrated embodiments of the present invention, various transportation support program workloads and functions 495.

Figure 5:
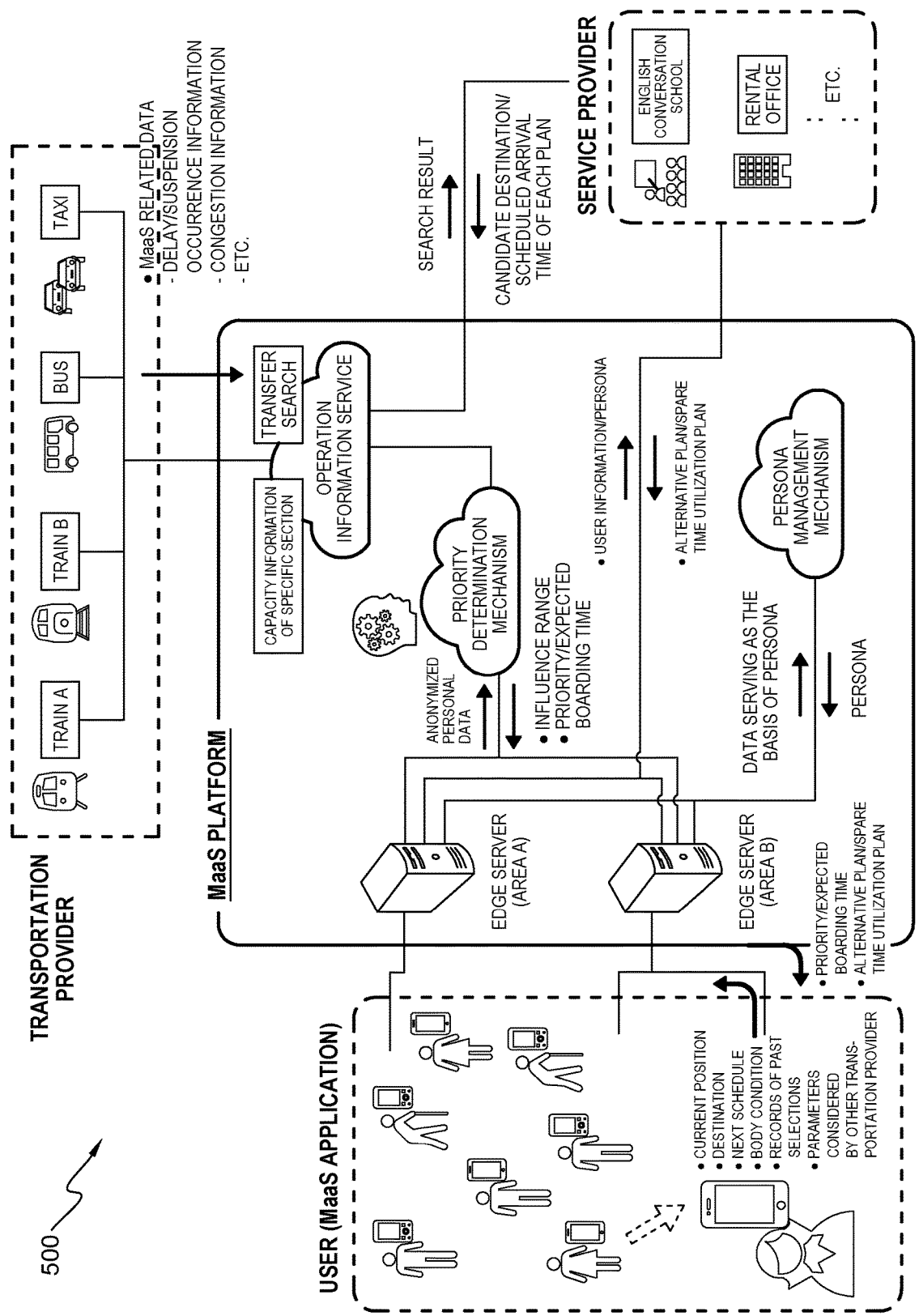
FIG. 5 is a more detailed functional block diagram illustrating the components of the MaaS transportation support environment, in accordance with an embodiment of the present invention.

FIG. 5 is a more detailed functional block diagram, generally designated 500, illustrating the components of MaaS transportation support environment 100, in accordance with an embodiment of the present invention. In the depicted embodiment, MaaS transportation support environment 100 includes User Unit $530_{1-N}$, Transportation Provider Unit $540_{1-N}$, Service Provider Unit $550_{1-N}$, and MaaS Platform Unit 560.

User Unit $530_{1-N}$ operates as a user computing device, similarly to user computing device $130_{1-N}$ as described earlier. In an embodiment, a user is an operator of a motor vehicle. In another embodiment, a user is a person who travels on a source of public transportation (i.e., a system of buses, trains, airplanes, etc. running on fixed routes, on which the public may travel). In some embodiments, there may be more than one user computing device $130_{1-N}$, i.e., more than one user, e.g., more than one operator of a motor vehicle or more than one commuter.

Transportation Provider Unit $540_{1-N}$ operates as a user computing device, similarly to user computing device $140_{1-N}$ as described earlier. In an embodiment, a transportation provider is a provider of commuter transportation (i.e., a system of buses, trains, airplanes, etc. running on fixed routes, on which the public may travel).

Service Provider Unit $550_{1-N}$ operates as a user computing device, similarly to user computing device $150_{1-N}$ as described earlier. In an embodiment, a service provider is a provider of any applicable good or service to the user (e.g., a business engaged in commercial, industrial, or professional activities).

MaaS Platform Unit 560 contains Edge Server $562_{1-N}$, priority decision mechanism unit 122-B, operation information service unit 122-C, and persona management mechanism unit 122-D.

Edge Server $562_{1-N}$ operates as a general-purpose IT computer that is located in a remote operations facility (e.g., a factory, retail store, hotel, distribution center, or bank). Edge Server $562_{1-N}$ may be constructed with an industrial PC or racked computer form factor. Edge Server $562_{1-N}$ may have 8, 16, or more cores of compute capacity, 16 GB of memory, and hundreds of GB s of local storage. Edge Server $562_{1-N}$ may be used to run enterprise application workloads and shared services.

Priority decision mechanism unit 122-B operates to receive the set of transportation operation information about the traffic event and the area identified from operation information service unit 122-C; identify an edge server (e.g., Edge Server $562_{1-N}$) responsible for the area affected by the traffic event. and instructs the edge server (e.g., Edge Server $562_{1-N}$) responsible for the area affected by the traffic event to identify one or more users affected by the traffic event (i.e., via user computing device $130_{1-N}$); identify a source of transportation of each user of the one or more users; cooperate with operation information service unit 122-C to identify one or more alternative sources of transportation accessible to the one or more users affected by the traffic event and to identify one or more sections with an insufficient source of transportation near the traffic event; identify the one or more users affected by the traffic event who will be passing through the one or more sections with the insufficient source of transportation near the traffic event; and prioritize the one or more users affected by the traffic event who will be passing through the one or more sections with the insufficient sources of transportation near the traffic event. In the depicted embodiment, priority decision mechanism unit 122-B is a unit of transportation support program 122 that resides on server computer 120. In another embodiment, priority decision mechanism unit 122-B may reside on a remote cloud.

Operation information service unit 122-C operates to receive information from Transportation Provider Unit $540_{1-N}$; to identify the area affected by the traffic event; to cooperate with priority decision mechanism unit 122-B to identify one or more alternative sources of transportation accessible to the one or more users affected by the traffic event, to identify one or more sections with an insufficient source of transportation near the traffic event, and to find an expected time of boarding for each user of the one or more users affected by the traffic event; and to determine whether the location of each alternative means on the list of alternative means is reachable by the user. In the depicted embodiment, operation information service unit 122-C is a unit of transportation support program 122 that resides on server computer 120. In another embodiment, operation information service unit 122-C may reside on a remote cloud.

Persona management mechanism unit 122-D operates to create and manage a persona used to improve accuracy of plans proposed to each user. In the depicted embodiment, persona management mechanism unit 122-D is a unit of transportation support program 122 that resides on server computer 120. In another embodiment, persona management mechanism unit 122-D may reside on a remote cloud.

Figure 6:
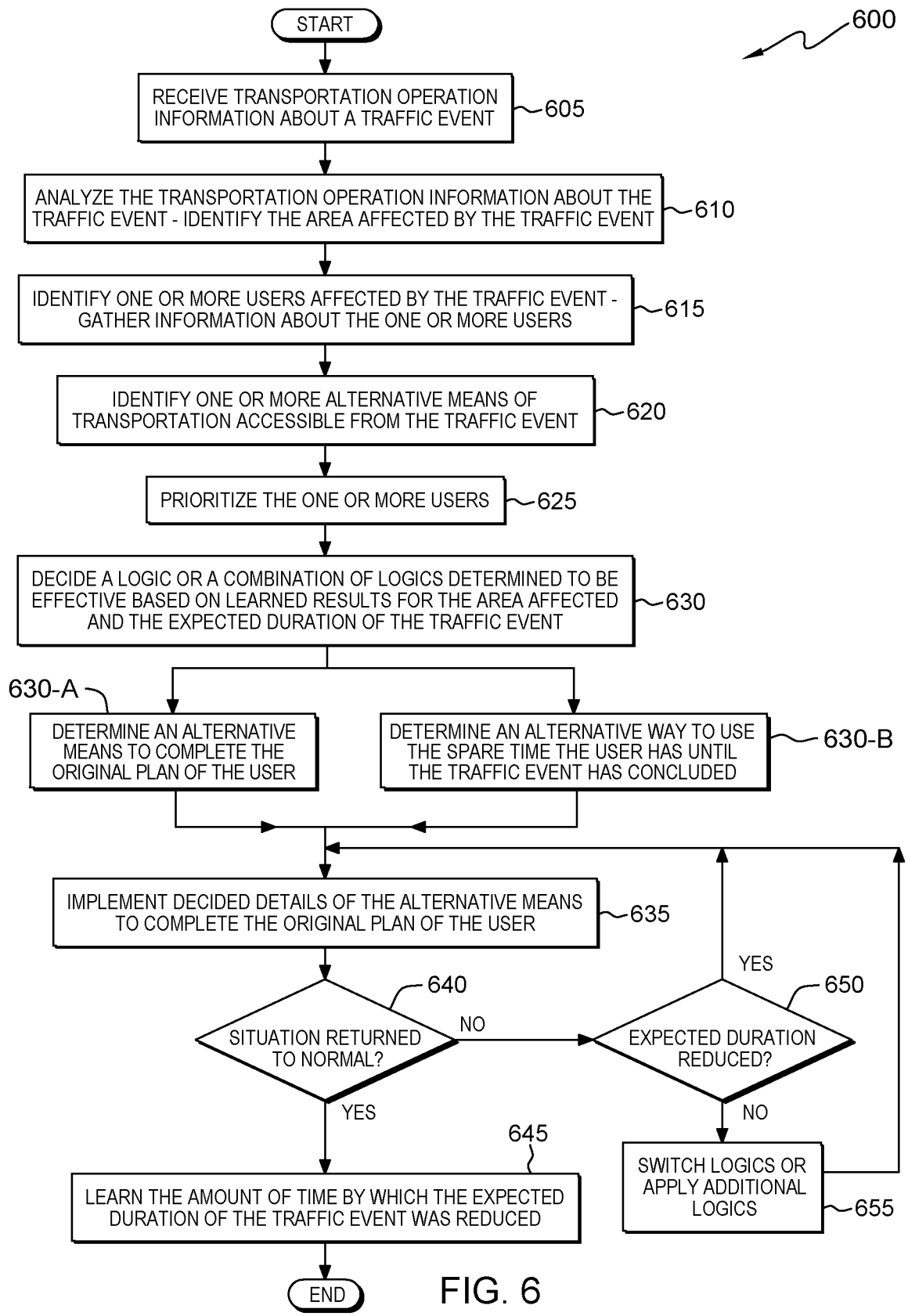
FIG. 6 is a flowchart illustrating the operational steps of a transportation support program, on the server within the MaaS transportation support environment of FIG. 1, in accordance with an embodiment of the present invention.

FIG. 6 is a flowchart, generally designated 600, illustrating the operational steps of transportation support program 122, on server 120 within MaaS transportation support environment 100 of FIG. 1, in accordance with an embodiment of the present invention. In an embodiment, transportation support program 122 operates to control a flow of passengers at a source of a disruption in public transportation in order to suppress any economic and/or noneconomic loss that the passengers and the service providers may experience. It should be appreciated that the process depicted in FIG. 6 illustrates one possible iteration of the process flow, which may be repeated each time a set of transportation operation information is received by transportation support program 122.

In step 605, transportation support program 122 (hereinafter referred to as "program 122") receives a set of transportation operation information about a traffic event from one or more transportation service providers (e.g., user computing device $140_{1-N}$). The traffic event is an event that causes a change in operations of the one or more transportation service provider. The traffic event may include, but is not limited to, an amount of traffic, a crash, or a hazard on a roadway that may impede a commute or a trip of a user and may cause the user to change sources of transportation. The set of transportation operation information about the traffic event is more specific details about the amount of traffic (e.g., moderate, heavy, standstill), the crash (e.g., minor, major, other side of the road), or the hazard on the roadway (e.g., on the road, shoulder, weather) that may impede the commute or the trip of the user. In another embodiment, program 122 detects the traffic event.

In step 610, operation information service unit 122-C of program 122 analyzes the set of transportation operation information about the traffic event to identify an area affected by the traffic event. In an embodiment, operation information service unit 122-C of program 122 identifies the area affected by the traffic event. In an embodiment, operation information service unit 122-C of program 122 transmits the set of transportation operation information about the traffic event and the area identified to priority decision mechanism unit 122-B of program 122. In an embodiment, priority decision mechanism unit 122-B of program 122 identifies an edge server (e.g., Edge Server $562_{1-N}$) responsible for the area affected by the traffic event.

In step 615, priority decision mechanism unit 122-B of program 122 instructs the edge server (e.g., Edge Server $562_{1-N}$) responsible for the area affected by the traffic event to identify one or more users affected by the traffic event (i.e., via user computing device $130_{1-N}$). In an embodiment, the edge server (e.g., Edge Server $562_{1-N}$) identifies the one or more users affected by the traffic event. In an embodiment, the edge server (e.g., Edge Server $562_{1-N}$) gathers information about the one or more users affected by the traffic event from a user profile stored in an application (e.g., application 134) on a user computing device of the user (e.g., user computing device $130_{1-N}$). The information gathered about the one or more users affected by the traffic event may include, but is not limited to, the current location of the one or more users, the destination location of the one or more users, and a schedule of the one or more users. In an embodiment, the edge server (e.g., Edge Server $562_{1-N}$) anonymizes each user of the one or more users by mapping the name of each user of the one or more users to a temporary identification number. In an embodiment, the edge server (e.g., Edge Server $562_{1-N}$) transmits the temporary identification number of each user of the one or more users to priority decision mechanism unit 122-B of program 122. In an embodiment, the edge server (e.g., Edge Server $562_{1-N}$) transmits the information about the one or more users (e.g., the current location of the one or more users, the destination location of the one or more users, and a schedule of the one or more users) to priority decision mechanism unit 122-B of program 122.

In step 620, priority decision mechanism unit 122-B of program 122 identifies a source of transportation of each user of the one or more users. In an embodiment, priority decision mechanism unit 122-B of program 122 identifies a source of transportation from a user profile on the application (e.g., application 134) on the user computing device of the user (e.g., user computing device $130_{1-N}$). In an embodiment, priority decision mechanism unit 122-B of program 122 cooperates with operation information service unit 122-C of program 122 to identify one or more alternative sources of transportation accessible to the one or more users affected by the traffic event. In an embodiment, priority decision mechanism unit 122-B of program 122 cooperates with operation information service unit 122-C of program 122 to identify one or more sections with an insufficient source of transportation near the traffic event. In an embodiment, priority decision mechanism unit 122-B of program 122 identifies the one or more users affected by the traffic event who will be passing through the one or more sections with the insufficient source of transportation near the traffic event.

For example, user X is traveling on train line A. A traffic event occurs on train line A. priority decision mechanism unit 122-B of program 122 cooperates with operation information service unit 122-C of program 122 to identify one or more alternative sources of transportation user X may take to user X's destination location. Priority decision mechanism unit 122-B of program 122 identifies train line B. User X along with multiple other users traveling on train line A plan to transfer to train line B. However, train line B does not have the capacity to accommodate user X and the multiple other users planning to transfer to train line B. Program 122 identifies train line A and train line B as sections with insufficient sources of transportation.

Figure 10:
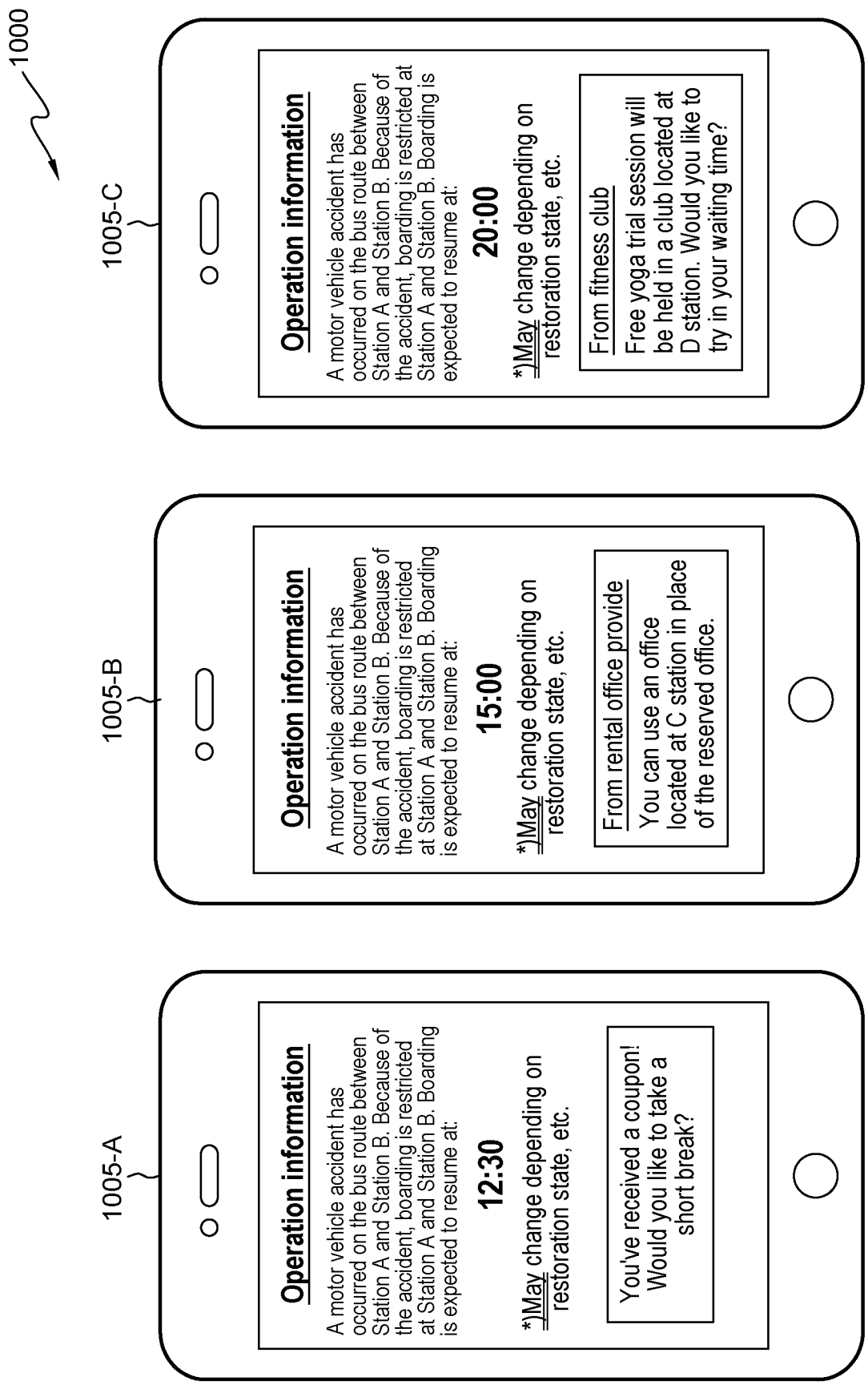
FIG. 10 is a diagram illustrating exemplary alert notifications sent during an application of the transportation support program, in accordance with an embodiment of the present invention.

In step 625, priority decision mechanism unit 122-B of program 122 prioritizes the one or more users affected by the traffic event who will be passing through the one or more sections with the insufficient sources of transportation near the traffic event. In an embodiment, priority decision mechanism unit 122-B of program 122 prioritizes the one or more users based on the information about the one or more users (e.g., the current location of the one or more users, the destination location of the one or more users, and the schedule of the one or more users). In an embodiment, priority decision mechanism unit 122-B of program 122 gives highest priority to any user who requires special care and attention due to a medical condition (e.g., an elderly person or a pregnant woman). In an embodiment, priority decision mechanism unit 122-B of program 122 cooperates with operation information service unit 122-C of program 122 to find an expected time of boarding for each user of the one or more users affected by the traffic event. In an embodiment, priority decision mechanism unit 122-B of program 122 transmits the temporary identification number, the priority number given, and the expected time of boarding for each user of the one or more users affected by the traffic event to the edge server (e.g., Edge Server $562_{1-N}$). In an embodiment, the edge server (e.g., Edge Server $562_{1-N}$) sends an alert notification to each user of the one or more users affected by the traffic event. In an embodiment, the edge server (e.g., Edge Server $562_{1-N}$) sends an alert notification to each user of the one or more users affected by the traffic event through user interface $132_{1-N}$ of user computing device $130_{1-N}$. In an embodiment, the edge server (e.g., Edge Server $562_{1-N}$) sends an alert notification to each user of the one or more users affected by the traffic event, notifying each user of the user's temporary identification number, the priority number given, and the expected time of boarding. An example of the alert notification sent to the user is depicted in FIG. 10 as 1005-A.

In an embodiment, program 122 repeats step 605 through 640 periodically. In an embodiment, program 122 updates the list of users affected by the traffic event when one or more new users are identified.

In step 630, program 122 selects a logic determined to be effective based on a set of machine learned results for the affected area and the expected amount of time until the traffic event has concluded. A logic may either be an alternative means to complete the original plan of the user or an alternative way to use the spare time the user has until the traffic event has concluded. In another embodiment, program 122 selects a combination of logics (i.e., by combining two or more logics) determined to be effective based on a set of machine learned results for the affected area and the expected amount of time until the traffic event has concluded. In an embodiment, program 122 selects a logic for an alternative means and proceeds to step 630-A, determining an alternative means to complete the original plan of each user. In another embodiment, program 122 selects a logic for an alternative way to use time until traffic event has concluded and proceeds to step 630-B, determining an alternative way to use the spare time each user has until the traffic event has concluded. In another embodiment, program 122 enables each user to request an alternative means to complete the original plan of each user (i.e., an alternative source of transportation to reach the destination location of the user or an alternative way to complete the original plan of the user at an alternative location) through user interface $132_{1-N}$ of user computing device $130_{1-N}$. In another embodiment, program 122 enables each user to request an alternative way to utilize the spare time each user has until the traffic event is complete through user interface $132_{1-N}$ of user computing device $130_{1-N}$. In an embodiment, responsive to a user requesting an alternative method to complete the original plan of the user or an alternative way to utilize the spare time the user has until the traffic event is complete, program 122 proceeds to step 630-A or to step 630-B, respectively.

In step 630-A, program 122 determines an alternative means to complete the original plan of the user. Step 630-A is described in further detail with respect to flowchart 700 in FIG. 7.

In step 630-B, program 122 determines an alternative way to use the spare time the user has until the traffic event has concluded. Step 630-B is described in further detail with respect to flowchart 800 in FIG. 8.

In step 635, program 122 enables the user to implement the alternative means to complete the original plan of the user. In another embodiment, program 122 enables the user to implement the alternative way to use the spare time the user has until the traffic event has concluded. In another embodiment, program 122 enables the user to implement a combination of the alternative means to complete the original plan of the user and the alternative way to use the spare time the user has until the traffic event has concluded.

In decision step 640, program 122 determines whether the traffic event has concluded. If program 122 determines the traffic event has concluded (decision step 640, YES branch), then program 122 proceeds to step 645, learning the amount of time by which the traffic event was reduced. If program 122 determines the traffic event has not concluded (decision step 640, NO branch), then program 122 proceeds to step 650, determining whether the expected amount of time of the traffic event has been reduced.

In step 645, program 122 learns the amount of time by which the traffic event was reduced. In an embodiment, program 122 learns (i.e., identifies, calculates) the amount of time by which the traffic event was reduced by comparing the actual time to the expected amount of time the traffic event was expected to last (i.e., based on a set of machine learned results for the affected area). In an embodiment, program 122 stores the amount of time by which the traffic event was reduced in a database, e.g., database 124.

In decision step 650, program 122 determines whether the expected amount of time of the traffic event has been reduced. If program 122 determines the expected amount of time of the traffic event has been reduced (decision step 650, YES branch), then program 122 returns to step 635, enabling the user to implement the alternative means to complete the original plan of the user. If program 122 determines the expected amount of time of the traffic event has not been reduced (decision step 650, NO branch), then program 122 proceeds to step 655, switching to an alternative logic determined to be effective based on a set of machine learned results for the affected area and the expected amount of time until the traffic event has concluded.

In step 655, program 122 switches to an alternative logic determined to be effective based on a set of machine learned results for the affected area and the expected amount of time until the traffic event has concluded (i.e., switches from implementing the alternative means to complete the original plan of the user to implementing the alternative way to use the spare time the user has until the traffic event has concluded or vice versa). In another embodiment, program 122 applies a remaining component of the combination of logics determined to be effective based on a set of machine learned results for the affected area and the expected amount of time until the traffic event has concluded.

Figure 7:
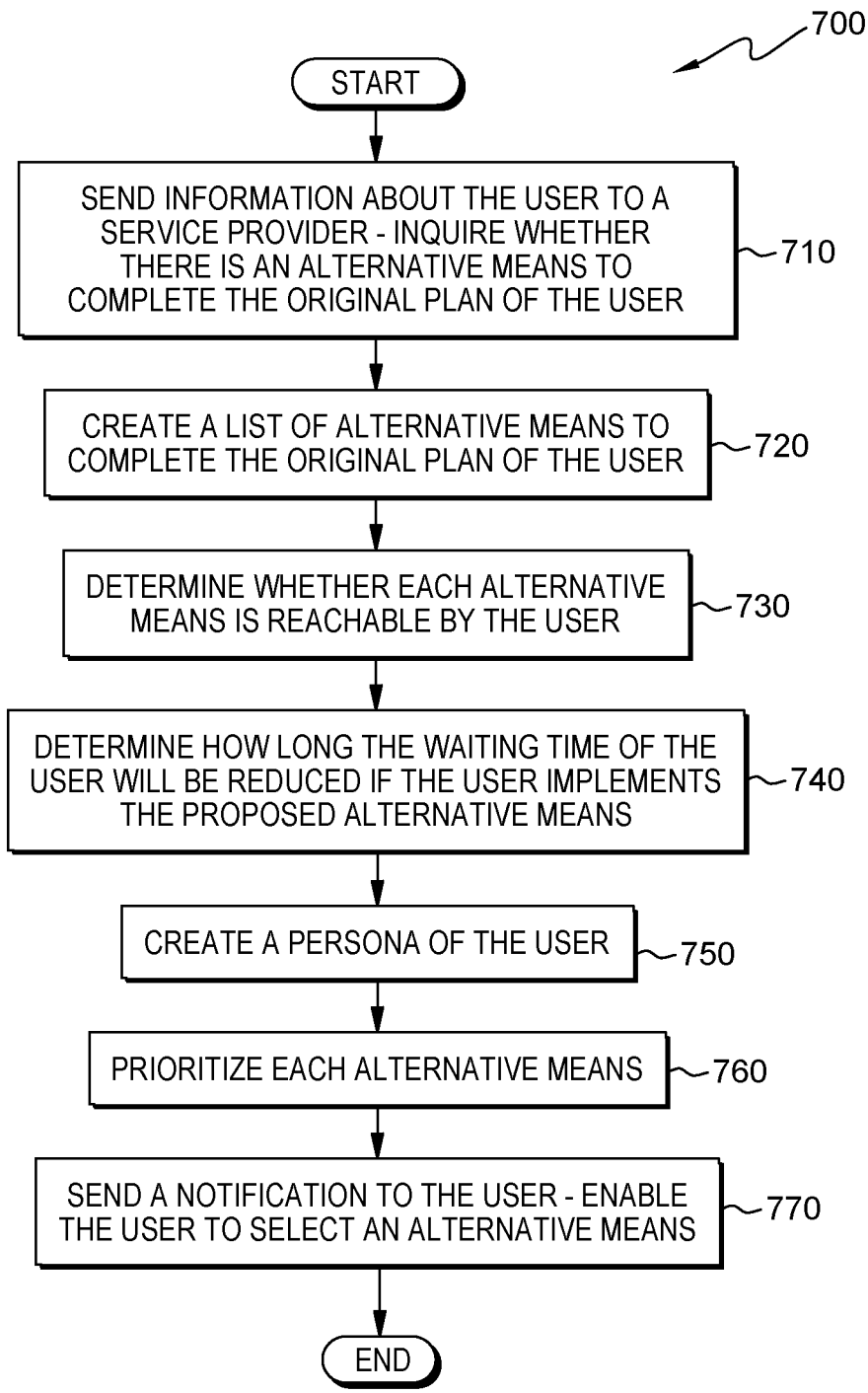
FIG. 7 is a flowchart illustrating the operational steps of a first component of the transportation support program, on the server within the MaaS transportation support environment of FIG. 1, in accordance with an embodiment of the present invention.

FIG. 7 is a flowchart, generally designated 700, illustrating the operational steps of a first component of transportation support program 122 (step 630-A), on server 120 within MaaS transportation support environment 100 of FIG. 1, in accordance with an embodiment of the present invention. In an embodiment, transportation support program 122 operates to determine an alternative means to complete the original plan of the user. It should be appreciated that the process depicted in FIG. 7 illustrates one possible iteration of the process flow, which may be repeated each time an alternative means logic or a combination of logics is selected.

In step 710, the edge server (e.g., Edge Server $562_{1-N}$) sends information about the user to a service provider (e.g., Service Provider Unit 550). The information about the user may include, but is not limited to, the user's assigned temporary identification number, current location, destination location, schedule, priority, and expected time of boarding. In an embodiment, the edge server (e.g., Edge Server $562_{1-N}$) inquires whether there is an alternative means to complete the original plan of the user while avoiding the effect of the traffic event. An alternative means may include, but is not limited to, at least one alternative source of transportation to reach the destination location of the user or at least one alternative way to complete the original plan of the user at an alternative location (e.g., a similar service offered at an alternative location).

In step 720, program 122 utilizes the service provider (e.g., Service Provider Unit 550) to create a list of alternative means to complete the original plan of the user. In an embodiment, program 122 identifies a location of each alternative means on the list of alternative means. In an embodiment, program 122 transmits the current location of the user and the location of each alternative means on the list of alternative means to operation information service unit 122-C to determine whether the location of each alternative means on the list of alternative means is reachable by the user. Reachable may mean the user is located within a pre-determined distance from the location of an alternative means. Reachable may also mean the user can travel from the current location of the user to the location of the alternative means in a pre-determined amount of time. Program 122 does not include information by which the user can be identified in the information transmitted to operation information service unit 122-C.

In step 730, responsive to operation information service unit 122-C determining at least one alternative means on the list of alternative means is reachable by the user, program 122 transmits a message to the edge server (e.g., Edge Server $562_{1-N}$), notifying of the presence of at least one alternative means reachable by the user. In another embodiment, responsive to operation information service unit 122-C determining at least one alternative means on the list of alternative means is not reachable by the user, program 122 transmits a message to the edge server (e.g., Edge Server $562_{1-N}$), notifying of the absence of at least one alternative means reachable by the user.

In step 740, priority decision mechanism unit 122-B of program 122 determines how long (i.e., by how many minutes or some unit of time) the waiting time of the user will be reduced if the user implements the proposed alternative means, wherein the reduction in wait time being provided to the user for the proposed alternative means is based on the combination of the two or more logics for determining the priority of the user. In an embodiment, priority decision mechanism unit 122-B of program 122 transmits an estimated time of arrival of the user by the proposed alternative means or at the proposed alternative means to the edge server (e.g., Edge Server $562_{1-N}$). In an embodiment, priority decision mechanism unit 122-B of program 122 transmits the estimated waiting time of the user to the edge server (e.g., Edge Server $562_{1-N}$).

In step 750, the edge server (e.g., Edge Server $562_{1-N}$) creates a persona of the user. In an embodiment, the edge server (e.g., Edge Server $562_{1-N}$) creates a persona of the user based on the information obtained about the user. In another embodiment, the edge server (e.g., Edge Server $562_{1-N}$) updates an existing persona based on information obtained about the user. The persona may be created in real time depending on the load of the edge server (e.g., Edge Server $562_{1-N}$). In an embodiment, the edge server (e.g., Edge Server $562_{1-N}$) transmits information to persona management mechanism unit 122-D. The information transmitted may include, but is not limited to, a persona selected for the user, one or more alternative means presented to the user, an alternative means selected by the user, and information disclosed by one or more other users. In distribute stored personae to the edge server (e.g., Edge Server $562_{1-N}$).

In step 760, the edge server (e.g., Edge Server $562_{1-N}$) decides a priority of each alternative means to be presented to the user. In an embodiment, the edge server (e.g., Edge Server $562_{1-N}$) decides a priority of notification for each alternative means to be presented to the user based on the persona created of the user. In another embodiment, the edge server (e.g., Edge Server $562_{1-N}$) decides a priority of notification for each alternative means to be presented to the user based on an expected economic loss of the user. In an embodiment, responsive to the edge server (e.g., Edge Server $562_{1-N}$) determining a large economic loss is expected from an alternative means, the edge server (e.g., Edge Server $562_{1-N}$) prioritizes the alternative means lower than the one or more alternative means with a small economic loss.

In step 770, the edge server (e.g., Edge Server $562_{1-N}$) sends an alert notification to the user. In an embodiment, the edge server (e.g., Edge Server $562_{1-N}$) sends an alert notification to the user through user interface $132_{1-N}$ of user computing device $130_{1-N}$. In an embodiment, the edge server (e.g., Edge Server $562_{1-N}$) sends an alert notification to the user, notifying the user of the priority of each alternative means and an estimated time of arrival of the user by the proposed alternative means or at the proposed alternative means. An example of the alert notification sent to the user is depicted in FIG. 10 as 1005-B.

In an embodiment, program 122 enables the user to select an alternative means from the one or more alternative means through user interface $132_{1-N}$ of user computing device $130_{1-N}$. In an embodiment, responsive to the user selecting an alternative means, the edge server (e.g., Edge Server $562_{1-N}$) sends a notification to the service provider (e.g., Service Provider Unit 550) through user interface $152_{1-N}$ of user computing device $150_{1-N}$. In an embodiment, the edge server (e.g., Edge Server $562_{1-N}$) sends a notification to the service provider (e.g., Service Provider Unit 550), notifying the service provider of the user's selection of an alternative means. In an embodiment, the edge server (e.g., Edge Server $562_{1-N}$) sends a notification to the service provider (e.g., Service Provider Unit 550), instructing the service provider to secure a resource of the alternative means.

In an embodiment, responsive to the user selecting an alternative means, the edge server (e.g., Edge Server $562_{1-N}$) sends a notification to priority decision mechanism unit 122-B. In an embodiment, the edge server (e.g., Edge Server $562_{1-N}$) sends a notification to priority decision mechanism unit 122-B, notifying priority decision mechanism unit 122-B that the user will not pass through the traffic event and instructing priority decision mechanism unit 122-B to adjust priorities of other users affected by the traffic event.

Figure 8:
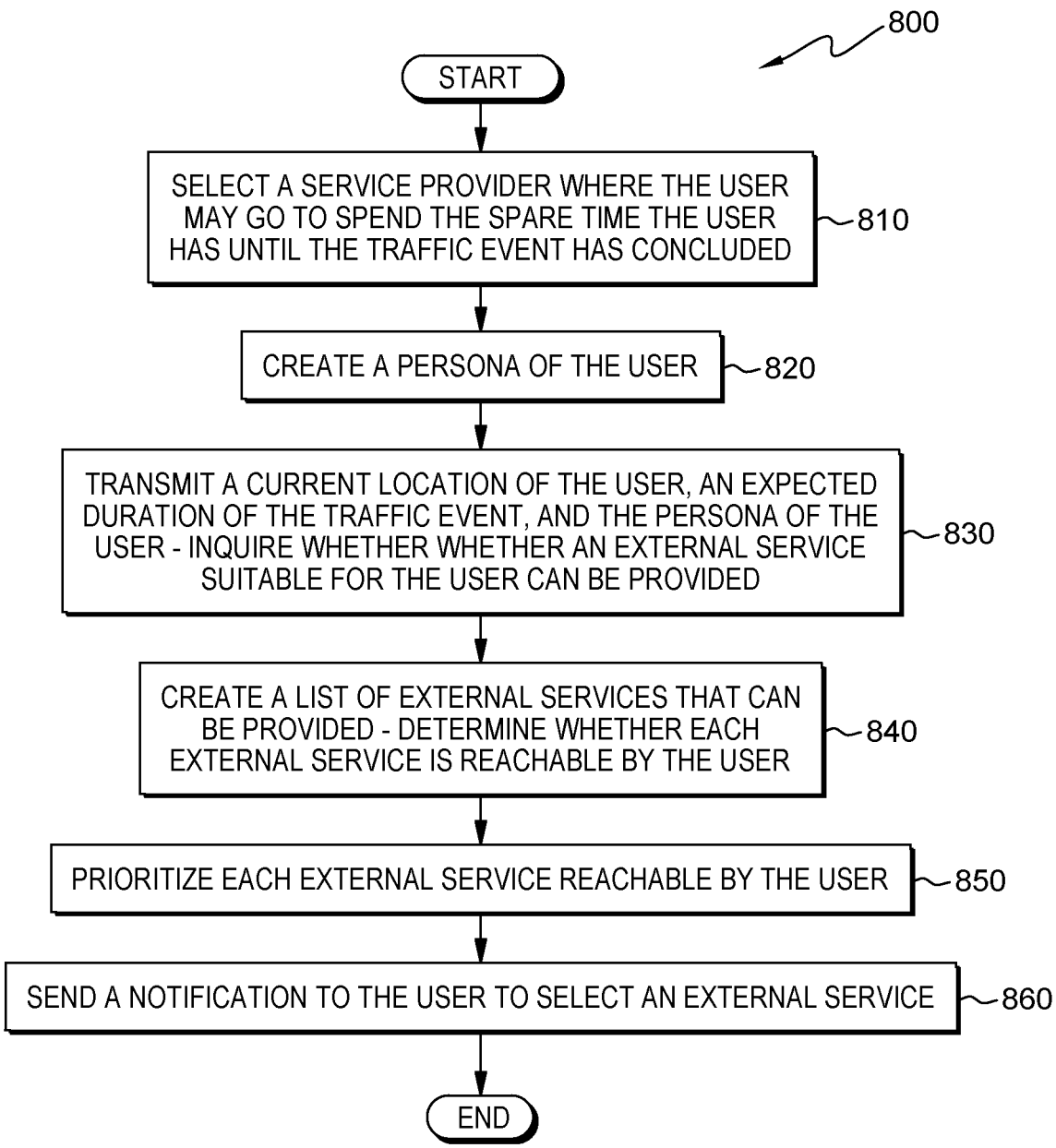
FIG. 8 is a flowchart illustrating the operational steps of a second component of the transportation support program, on the server within the MaaS transportation support environment of FIG. 1, in accordance with an embodiment of the present invention.

FIG. 8 is a flowchart, generally designated 800, illustrating the operational steps of a second component of transportation support program 122 (step 630-B), on server 120 within MaaS transportation support environment 100 of FIG. 1, in accordance with an embodiment of the present invention. In an embodiment, transportation support program 122 operates to determine an alternative way to utilize the spare time the user has until the traffic event has concluded. It should be appreciated that the process depicted in FIG. 8 illustrates one possible iteration of the process flow, which may be repeated each time an alternative use of time logic or a combination of logics is selected.

In step 810, the edge server (e.g., Edge Server $562_{1-N}$) selects a service provider. In another embodiment, the edge server (e.g., Edge Server $562_{1-N}$) selects more than one service provider. In an embodiment, the edge server (e.g., Edge Server $562_{1-N}$) selects a service provider (i.e., an external service provider) where the user may go to spend the spare time the user has until the traffic event has concluded. In an embodiment, the edge server (e.g., Edge Server $562_{1-N}$) selects a service provider based on a history of past actions of the user.

In step 820, the edge server (e.g., Edge Server $562_{1-N}$) creates a persona of the user. In an embodiment, the edge server (e.g., Edge Server $562_{1-N}$) creates a persona of the user based on the information obtained about the user. In another embodiment, the edge server (e.g., Edge Server $562_{1-N}$) updates an existing persona with information obtained about the user. The persona may be created in real time depending on the load of the edge server (e.g., Edge Server $562_{1-N}$). In an embodiment, the edge server (e.g., Edge Server $562_{1-N}$) transmits information to persona management mechanism unit 122-D. The information transmitted may include, but is not limited to, the persona created of the user, one or more alternative means presented to the user, an alternative means selected by the user, and information disclosed by one or more other users. In distribute stored personae to the edge server (e.g., Edge Server $562_{1-N}$).

In step 830, the edge server (e.g., Edge Server $562_{1-N}$) transmits a current location of the user, an expected duration of the traffic event, and the persona created of the user to the service provider selected. In an embodiment, the edge server (e.g., Edge Server $562_{1-N}$) inquires whether the service provider selected can provide an external service suitable for the user by communicating with the service provider selected through user computing device $150_{1-N}$.

In step 840, program 122 enables the service provider selected to create a list of external services that can be provided to the user. In an embodiment, program 122 transmits the current location of the user and the location of each external service on the list of external services to operation information service unit 122-C. In an embodiment, program 122 transmits the current location of the user and the location of each external service on the list of external services to operation information service unit 122-C to determine whether the location of each external service on the list of external services is reachable by the user. Reachable may mean the user is located within a pre-determined distance from the location of the external service. Reachable may also mean the user can travel from the current location of the user to the location of the external service in a pre-determined amount of time. Program 122 does not include information by which the user can be identified in the information transmitted to operation information service unit 122-C. The information about the user is anonymized due to the use of the persona.

In step 850, operation information service unit 122-C transmits each external service on the list of external services that is reachable by the user to the edge server (e.g., Edge Server 562140. In an embodiment, the edge server (e.g., Edge Server $562_{1-N}$) prioritizes each external service on the list of external services that is reachable by the user. In an embodiment, the edge server (e.g., Edge Server $562_{1-N}$) prioritizes each external service on the list of external services that is reachable by the user based on the persona of the user.

In an embodiment, the edge server (e.g., Edge Server $562_{1-N}$) sends an alert notification to the user through user interface $132_{1-N}$ of user computing device $130_{1-N}$. In an embodiment, the edge server (e.g., Edge Server $562_{1-N}$) sends an alert notification to the user, notifying the user of each external service on the list of external services that is reachable by the user, the priority of each external service, and an expected time of boarding. An example of the alert notification sent to the user is depicted in FIG. 10 as 1005-C.

In step 860, program 122 enables the user to select an external service from the list of external services through user interface $132_{1-N}$ of user computing device $130_{1-N}$. In an embodiment, responsive to the user selecting an external service from the list of external services, the edge server (e.g., Edge Server $562_{1-N}$) sends an alert notification to the external service provider selected by the user through user interface $152_{1-N}$ of user computing device $150_{1-N}$. In an embodiment, the edge server (e.g., Edge Server $562_{1-N}$) mediates communication between the user (i.e., through user computing device $130_{1-N}$) and the external service provider selected by the user (i.e., through user computing device $150_{1-N}$).

In an embodiment, the edge server (e.g., Edge Server $562_{1-N}$) sends a notification to priority decision mechanism unit 122-B. In an embodiment, the edge server (e.g., Edge Server $562_{1-N}$) sends a notification to priority decision mechanism unit 122-B, notifying priority decision mechanism unit 122-B that the user will not pass through the traffic event and urging priority decision mechanism unit 122-B to adjust the priorities of other users affected by the traffic event.

In an embodiment, program 122 repeats the process periodically to collect information about new users and new traffic events which may affect the user. In an embodiment, program 122 updates accordingly.

Figure 9:
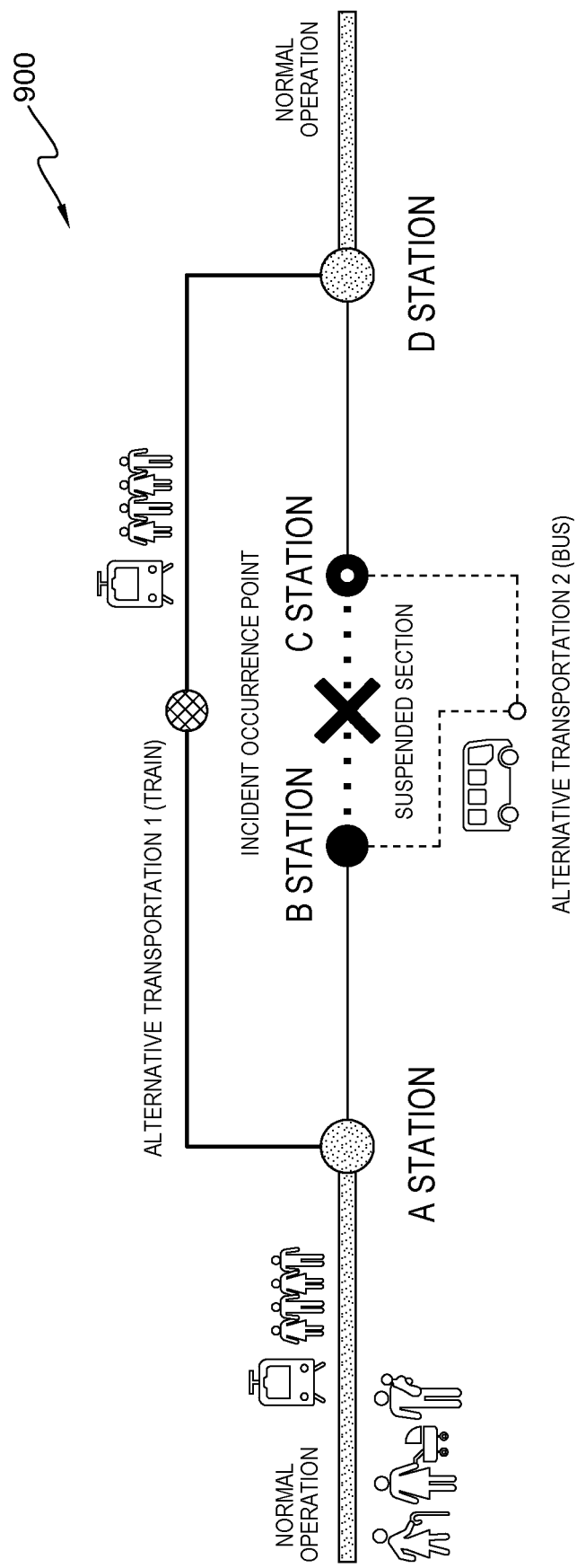
FIG. 9 is a diagram illustrating an exemplary application of the transportation support program, in accordance with an embodiment of the present invention.

FIG. 9 is a diagram, generally designated 900, illustrating an exemplary application of transportation support program 122, in accordance with an embodiment of the present invention. In the exemplary application transportation support program 122, a major crash occurred between Station B and Station C of a bus route. The crash has caused bus service between Station B and Station C to be suspended. Without the support of transportation support program 122, the commuters using the bus service, in response to the crash, must independently find an alternative source of transportation as well as the capacity of the alternative source of transportation (i.e., to avoid a large amount of the commuters opting to use a certain alternative source of transportation). With the support of transportation support program 122, the commuters using the bus service, in response to the crash, are guided to their destination location by an alternative means of transportation. Transportation support program 122 decides priority based on the destination location of the commuters using the bus service which passes through the section of the bus route between Station B and Station C, the affected station. Transportation support program 122 establishes limited operations sections between Stations A and B and between Stations C and D that are restricted to select commuters. The select commuters are transported through the limited operations sections using the reduced service provided and/or the single-track operations available. Transportation support program 122 guides the commuters passing through Station A and going beyond Station D to alternative source of transportation 1. Transportation support program 122 guides the commuters passing through a station between Station A and Station B to a train operating in the limited operation section. Transportation support program 122 guides the commuters passing through a station between Station C and Station D to board an alternative source of transportation, wait at Station B, or take a detour from Station A to Station D using alternative source of transportation 1 and then board a train for Station C in the limited operation section (between section C and section D), according to the capacity of alternative source of transportation 2. Lastly, transportation support program 122 notifies the commuters going to a station located between Station B and Station C that they will be on standby at the nearest station.

FIG. 10 is a diagram, generally designated 1000, illustrating exemplary alert notifications sent during an application of transportation support program 122, in accordance with an embodiment of the present invention. In exemplary alert notification 1005-A, each user affected by the traffic event is notified of the user's assigned temporary identification number, the priority given, and the expected time of boarding. In exemplary alert notification 1005-B, each user affected by the traffic event is notified of the priority of each alternative means and an estimated time of arrival of the user by the proposed alternative means or at the proposed alternative means. In exemplary alert notification 1005-C, each user affected by the traffic event is notified of each external service on the list of external services that is reachable by the user, the priority of each external service, and the expected time of boarding.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a set of transportation operation information from one or more transportation service providers about a traffic event;
   analyzing, by the one or more processors, the set of transportation operation information to identify an area affected by the traffic event and one or more users affected by the traffic event;
   gathering, by the one or more processors, a set of information about each user of the one or more users affected by the traffic event from respective applications on respective user computing devices of the one or more users, wherein the set of information includes an original plan for each user of the one or more users affected by the traffic event;
   prioritizing, by the one or more processors, the one or more users affected by the traffic event based on the set of information;
   determining, by the one or more processors, an alternative plan for each user of the one or more users affected by the traffic event based on the set of information and a priority number given to each user, wherein determining the alternative plan for each user of the one or more users affected by the traffic event to avoid the effect of the traffic event further includes selecting a logic determined to be effective based on a set of machine learned results for the area affected by the traffic event and an expected amount of time until the traffic event has concluded; and
   proposing, by the one or more processors, the alternative plan to each user of the one or more users affected by the traffic event.

2. The method of claim 1, wherein the set of information about each user of the one or more users affected by the traffic event further includes a current location of a respective user, a destination location of the respective user, and a schedule of the respective user.

3. The method of claim 1, further comprising:
   subsequent to gathering the set of information about each user of the one or more users affected by the traffic event from the respective applications on the respective user computing devices of the one or more users affected by the traffic event, anonymizing, by the one or more processors, each user by mapping a name of each user to a temporary identification number.

4. The method of claim 1, wherein gathering the set of information about each user of the one or more users affected by the traffic event from the respective applications on the respective user computing devices of the one or more users affected by the traffic event further comprises:
   identifying, by the one or more processors, a source of transportation of each user of the one or more users affected by the traffic event; and
   identifying, by the one or more processors, one or more alternative sources of transportation accessible to each user of the one or more users affected by the traffic event.

5. The method of claim 1, wherein a highest priority number is given to a user who requires special care and attention due to a medical condition.

6. The method of claim 1, wherein
   the logic is a combination of two or more logics determined to be effective based on the set of machine learned results for the area affected by the traffic event and the expected amount of time until the traffic event has concluded.

7. The method of claim 1, wherein the logic is an alternative means to complete the original plan of the user or an alternative way to use a spare time the user has until the traffic event has concluded.

8. The method of claim 1, further comprising:
   determining, by the one or more processors, whether the traffic event has concluded;
   responsive to determining the traffic event has not concluded, determining, by the one or more processors, whether the expected amount of time until the traffic event has concluded has been reduced; and
   responsive to determining the expected amount of time of the traffic event has not been reduced, switching, by the one or more processors, to an alternative logic determined to be effective based on the set of machine learned results for the affected area and the expected amount of time until the traffic event has concluded.

9. A computer program product comprising:
   one or more computer readable storage media and program instructions stored on the one or more computer readable storage media, the program instructions comprising:
   program instructions to receive a set of transportation operation information from one or more transportation service providers about a traffic event;
   program instructions to analyze the set of transportation operation information to identify an area affected by the traffic event and one or more users affected by the traffic event;
   program instructions to gather a set of information about each user of the one or more users affected by the traffic event from respective applications on respective user computing devices of the one or more users, wherein the set of information includes an original plan for each user of the one or more users affected by the traffic event;

program instructions to prioritize the one or more users affected by the traffic event based on the set of information;

program instructions to determine an alternative plan for each user of the one or more users affected by the traffic event based on the set of information and a priority number given to each user, wherein the program instructions to determine the alternative plan for each user of the one or more users affected by the traffic event to avoid the effect of the traffic event further include instructions to select a logic determined to be effective based on a set of machine learned results for the area affected by the traffic event and an expected amount of time until the traffic event has concluded; and program instructions to propose the alternative plan to each user of the one or more users affected by the traffic event.

10. The computer program product of claim 9, further comprising:

subsequent to gathering the set of information about each user of the one or more users affected by the traffic event from the respective applications on the respective user computing devices of the one or more users affected by the traffic event, program instructions to anonymize each user by mapping a name of each user to a temporary identification number.

11. The computer program product of claim 9, wherein gathering the set of information about each user of the one or more users affected by the traffic event from the respective applications on the respective user computing devices of the one or more users affected by the traffic event further comprises:

program instructions to identify a source of transportation of each user of the one or more users affected by the traffic event; and program instructions to identify one or more alternative sources of transportation accessible to each user of the one or more users affected by the traffic event.

12. The computer program product of claim 9, wherein a highest priority number is given to a user who requires special care and attention due to a medical condition.

13. The computer program product of claim 9, wherein the logic is a combination of two or more logics determined to be effective based on the set of machine learned results for the area affected by the traffic event and the expected amount of time until the traffic event has concluded.

14. The computer program product of claim 9, further comprising:

program instructions to determine whether the traffic event has concluded;

responsive to determining the traffic event has not concluded, program instructions to determine whether the expected amount of time until the traffic event has concluded has been reduced; and responsive to determining the expected amount of time of the traffic event has not been reduced, program instructions to switch to an alternative logic determined to be effective based on the set of machine learned results for the affected area and the expected amount of time until the traffic event has concluded.

15. A computer system comprising:
one or more computer processors;
one or more computer readable storage media;
program instructions collectively stored on the one or more computer readable storage media for execution by at least one of the one or more computer processors, the stored program instructions comprising:

program instructions to receive a set of transportation operation information from one or more transportation service providers about a traffic event;

program instructions to analyze the set of transportation operation information to identify an area affected by the traffic event and one or more users affected by the traffic event;

program instructions to gather a set of information about each user of the one or more users affected by the traffic event from respective applications on respective user computing devices of the one or more users, wherein the set of information includes an original plan for each user of the one or more users affected by the traffic event;

program instructions to prioritize the one or more users affected by the traffic event based on the set of information;

program instructions to determine an alternative plan for each user of the one or more users affected by the traffic event based on the set of information and a priority number given to each user, wherein the program instructions to determine the alternative plan for each user of the one or more users affected by the traffic event to avoid the effect of the traffic event further include instructions to select a logic determined to be effective based on a set of machine learned results for the area affected by the traffic event and an expected amount of time until the traffic event has concluded; and program instructions to propose the alternative plan to each user of the one or more users affected by the traffic event.

16. The computer system of claim 15, further comprising:

subsequent to gathering the set of information about each user of the one or more users affected by the traffic event from the respective applications on the respective user computing devices of the one or more users affected by the traffic event, program instructions to anonymize each user by mapping a name of each user to a temporary identification number.

17. The computer system of claim 15, wherein gathering the set of information about each user of the one or more users affected by the traffic event from the respective applications on the respective user computing devices of the one or more users affected by the traffic event further comprises:

program instructions to identify a source of transportation of each user of the one or more users affected by the traffic event; and program instructions to identify one or more alternative sources of transportation accessible to each user of the one or more users affected by the traffic event.

18. The computer system of claim 15, wherein a highest priority number is given to a user who requires special care and attention due to a medical condition.

19. The computer system of claim 15, wherein
the logic is a combination of two or more logics determined to be effective based on the set of machine learned results for the area affected by the traffic event and the expected amount of time until the traffic event has concluded.

20. The computer system of claim 15, further comprising:
program instructions to determine whether the traffic event has concluded;

responsive to determining the traffic event has not concluded, program instructions to determine whether the expected amount of time until the traffic event has concluded has been reduced; and responsive to determining the expected amount of time of the traffic event has not been reduced, program instructions to switch to an alternative logic determined to be effective based on the set of machine learned results for the affected area and the expected amount of time until the traffic event has concluded.

* * * * *